(12) United States Patent
Abbott et al.

(10) Patent No.: US 10,019,709 B2
(45) Date of Patent: Jul. 10, 2018

(54) SYSTEM OF ANONYMOUS USER CREATION BASED ON OBLIVIOUS TRANSFER

(71) Applicant: BANK OF AMERICA CORPORATION, Charlotte, NC (US)

(72) Inventors: Robert L. Abbott, Charlotte, NC (US); Frederick A. Shahda, Charlotte, NC (US); Alfred Hamilton, Charlotte, NC (US); Jason P. Blackhurst, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 517 days.

(21) Appl. No.: 14/746,371

(22) Filed: Jun. 22, 2015

(65) Prior Publication Data
US 2016/0371684 A1 Dec. 22, 2016

(51) Int. Cl.
*G06Q 40/00* (2012.01)
*G06Q 20/38* (2012.01)
*H04L 29/06* (2006.01)

(52) U.S. Cl.
CPC ... *G06Q 20/38215* (2013.01); *H04L 63/0421* (2013.01); *H04L 63/0428* (2013.01); *G06Q 2220/00* (2013.01); *H04L 2463/102* (2013.01)

(58) Field of Classification Search
CPC ......... G06Q 2220/00; G06Q 20/38215; G06Q 20/382; G06Q 40/00; H04L 63/0421; H04L 63/0428; H04L 2463/102
USPC .......................................................... 705/64
See application file for complete search history.

(56) References Cited

U.S. PATENT DOCUMENTS

| | | | |
|---|---|---|---|
| 6,834,272 B1 | 12/2004 | Naor et al. | |
| 7,181,017 B1 | 2/2007 | Nagel et al. | |
| 7,406,436 B1 * | 7/2008 | Reisman | G06Q 30/02 705/7.32 |
| 8,132,006 B2 | 3/2012 | Ramzan et al. | |

(Continued)

OTHER PUBLICATIONS

Michael O. Rabin. "How to exchange secrets by oblivious transfer." Technical Report TR-81, Aiken Computation Laboratory, Harvard University, 1981.

(Continued)

*Primary Examiner* — Lalita M Hamilton
(74) *Attorney, Agent, or Firm* — Michael A. Springs; Moore & Van Allen PLLC; Nicholas C. Russell (57) ABSTRACT

Embodiments of the invention include systems, methods, and computer-program products for anonymizing a user utilizing oblivious transfer. In this way, the invention establishes a common index to identify members of a population sample, anonymizes the identities of sample members to each party, and exchanges statistics and characteristics of the sample population. The invention creates a common searchable index and anonymizes the sample members of the database via encryption of identification of individual customers in each sample. Each encryption provides for a strong encryption with a key and a homomorphic encryption. The homomorphic encryption allows for multiplication and/or addition on ciphertexts that, once decrypted, match the result that would have occurred had the operations been carried out on the plaintext. In some embodiments, the encryption may be either partially- or fully-homomorphic cryptosystems.

19 Claims, 4 Drawing Sheets

(56) References Cited

U.S. PATENT DOCUMENTS

| | | | |
|---|---|---|---|
| 8,171,051 B2 | 5/2012 | Fattal et al. | |
| 8,520,842 B2 | 8/2013 | Nice et al. | |
| 8,522,040 B2 | 8/2013 | Camenisch et al. | |
| 8,538,937 B2 | 9/2013 | Numao et al. | |
| 8,539,220 B2 | 9/2013 | Raykova et al. | |
| 2007/0067297 A1* | 3/2007 | Kublickis | G06Q 30/02 |
| 2007/0214037 A1* | 9/2007 | Shubert | G06Q 20/02 |
| | | | 705/7.32 |
| 2009/0150362 A1* | 6/2009 | Evenhaim | G06F 21/6254 |
| 2012/0046994 A1* | 2/2012 | Reisman | G06Q 30/02 |
| | | | 705/7.29 |
| 2012/0167189 A1 | 6/2012 | Aichroth et al. | |
| 2016/0232546 A1* | 8/2016 | Ranft | G06Q 30/0206 |

OTHER PUBLICATIONS

Yuval Ishai and Eyal Kushilevitz. "Private simultaneous messages protocols with applications." In Proc. of ISTCS'97, IEEE Computer Society, pp. 174-184, 1997.

Paillier, Pascal (1999). "Public-Key Cryptosystems Based on Composite Degree Residuosity Classes". EUROCRYPT. Springer. pp. 223-238.

C. Gentry (2009). "A Fully Homomorphic Encryption Scheme." Ph.D. Thesis, retrieved from http://crypto.stanford.edu/craig/craig-thesis.pdf.

Z. Brakerski, C. Gentry, and V. Vaikuntanathan. Fully Homomorphic Encryption without Bootstrapping. In ITCS 2012.

* cited by examiner

SYSTEM OF ANONYMOUS USER CREATION BASED ON OBLIVIOUS TRANSFER

BACKGROUND

Individuals are concerned about privacy today and do not desire their personal information or identifying information to be shared without their permission. Businesses and other entities, however, often desire feedback from institutions on the results associated with actions taken by the business or entity. For example, a business is often interested in the characteristics of individuals responding to an advertisement.

Institutions would like to provide this information to the business but also retain the privacy of their customers or clients. Previously, institutions may have been able to provide semi-anonymous data by building multiple models at different scales but this approach is labor and data intensive, requires frequent updating and management, and can be overcome by an iterative approach that identifies personally-identifiable information.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Embodiments of the present invention address the above needs and/or achieve other advantages by providing apparatuses (e.g., a system, computer program product and/or other devices) and methods for anonymous creation and distribution of customer data between parties using oblivious transfer methods.

Today, industries compile significant amounts of data regarding vendors, merchants, and customers. This data can be in several forms, including both public and non-public information (NPI) data forms. Typically, the NPI data is subject to data privacy regulations. In some aspects, data, both private and public may be shared among parties for advertisement strategies, supply chain logistics, and/or in order to better serve customers.

In this way, it is desirable and necessary to share aggregated information in an anonymous way with third-party organizations to create value for customers. A major challenge with this exchange of information is that over time, with a large number of data exchanges and a reasonably finite customer population, statistical patterns can emerge which lead to one or both parties unintentionally learning additional information about the customers correlated to the data.

In some embodiments, the invention eliminates these correlation possibilities by compiling data associated with customers and storing the data in an index. The established index may be a common index that is searchable in order to identify members of a population sample desired to review or provide to third parties. Once a request is received for a population sample, the system may anonymizing the identities of sample members to each party. Anonymization is done via encryption of identification of individual customers in each sample. Each encryption provides for a strong encryption with a key and a homomorphic encryption. The homomorphic encryption allows for multiplication and/or addition on ciphertexts that, once decrypted, match the result that would have occurred had the operations been carried out on the plaintext. In some embodiments, the encryption may be either partially- or fully-homomorphic cryptosystems. Furthermore the encryption may be an offset of the actual data values for further security.

In some embodiments, once encrypted, the system may exchange statistics and characteristics of the sample population in a manner that precludes the receiver from learning anything specific about a particular member of the sample.

Generally, systems, computer program products, and methods are described herein for an application and system that provides anonymous data in response to a request for information, wherein the request has the potential to disclose personally-identifiable information.

Embodiments of the invention relate to systems, methods, and computer program products for generating a database with a searchable common index of customer data associated with customers, wherein the customer data is customer transaction data; receiving a request from a requestor for a population of data points within the database; matching the request for the population of data points to customer data associated with the customer total spend on the database, wherein the match generates a sample population of customer data that represents a customer value for the requestor; encrypting the matched data using a cryptosystem comprising homomorphic encryption; sending, via a distributive network, an aggregated encrypted matched data for the population of data points that includes an encrypted customer identification to the requestor; compiling a set of double encrypted customer value data for the population of data points by allowing the requestor to include additional requestor data with the aggregated encrypted matched data and allow encryption using random number encryption; and storing compiled set of double encrypted customer value data for the population of data points at a financial institution and the requestor.

In some embodiments, the homomorphic encryption includes fully homomorphic encryption, wherein fully homomorphic encryption allows allow multiplication and/or addition on ciphertexts that, once decrypted, match the result that would have occurred had the operations been carried out on the plaintext. In other embodiments, the homomorphic encryption includes partially homomorphic encryption.

In some embodiments, the request includes customer information of the requestor, such as a customer identification, wherein the requestor provides the system with information about one or more customers of the requestor to receive total spend data for the one or more customers. In some embodiments, the requestor is a merchant and requestor data includes identifications of one or more customer transactions at the merchant.

In some embodiments, the searchable common index of customer data associated with a customer is further compiled to create a customer total spend, wherein the customer total spend is a holistic view of customer spending over a time frame.

In some embodiments, receiving the request from the requestor for the population of data points further comprises a request for customer data that matches one or more customer transactions at the requestor.

In some embodiments, the invention further comprises exchanging the double encrypted customer value data for statistics and characteristic analysis of the sample population.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of businesses that may are associated with total spend item level affinity identification.

Some portions of this disclosure are written in terms of a financial institution's unique position with respect to customer transactions. As such, a financial institution may be able to utilize its unique position to monitor and identify transactions for products or with merchants that utilize financial institution accounts to complete the transactions.

The embodiments described herein may refer to the initiation and completion of a transaction. Unless specifically limited by the context, a "transaction", "transaction event" or "point of transaction event" refers to any customer completing or initiating a purchase for a product, service, or the like. The embodiments described herein may refer to an "advertisement." An advertisement, as used herein may include one or more of a deal, offer, coupon, promotion, incentive, commercial, advertisement, or the like. The advertisement may be for a product, service, merchant, merchant, brand, or the like. Furthermore, the term "product" as used herein may refer to any product, service, good, or the like that may be purchased through a transaction.

Furthermore, the term "electronic receipt" or "e-receipt" as used herein may include any electronic communication between a merchant and a customer, where the communication is associated with a transaction. In this way, e-receipts may include information about the transaction, such as location of purchase, the transaction total, order confirmations, shipping confirmations, item description, SKU data, merchant name, merchant web address, order number, order date, product description, product name, product quantity, product price, product image, hyperlink to the product image on merchant website, sales tax, shipping cost, order total, billing address, shipping company, shipping address, estimated shipping date, estimated delivery date, tracking number, and the like.

The embodiments described herein may refer to the use of a transaction, transaction event or point of transaction event to trigger the steps, functions, routines, or the like described herein. In various embodiments, occurrence of a transaction triggers the sending of information such as offers and the like. Unless specifically limited by the context, a "transaction", "transaction event" or "point of transaction event" refers to any communication between the customer and the merchant, e.g. financial institution, or other entity monitoring the customer's activities. In some embodiments, for example, a transaction may refer to a purchase of goods or services, a return of goods or services, a payment transaction, a credit transaction, or other interaction involving a customer's bank account. As used herein, a "bank account" refers to a credit account, a debit/deposit account, or the like. Although the phrase "bank account" includes the term "bank," the account need not be maintained by a bank and may, instead, be maintained by other financial institutions. For example, in the context of a financial institution, a transaction may refer to one or more of a sale of goods and/or services, an account balance inquiry, a rewards transfer, an account money transfer, opening a bank application on a customer's computer or mobile device, a customer accessing their e-wallet or any other interaction involving the customer and/or the customer's device that is detectable by the financial institution. As further examples, a transaction may occur when an entity associated with the customer is alerted via the transaction of the customer's location. A transaction may occur when a customer accesses a building, uses a rewards card, and/or performs an account balance query. A transaction may occur as a customer's mobile device establishes a wireless connection, such as a Wi-Fi connection, with a point-of-sale (or point-of-transaction) terminal. In some embodiments, a transaction may include one or more of the following: purchasing, renting, selling, and/or leasing goods and/or services (e.g., groceries, stamps, tickets, DVDs, vending machine items, and the like); withdrawing cash; making payments to creditors (e.g., paying monthly bills; paying federal, state, and/or local taxes and/or bills; or the like); sending remittances; transferring balances from one account to another account; loading money onto stored value cards (SVCs) and/or prepaid cards; donating to charities; and/or the like.

In some embodiments, the transaction may refer to an event and/or action or group of actions facilitated or performed by a customer's device, such as a customer's mobile device. Such a device may be referred to herein as a "point-of-transaction device". A "point-of-transaction" could refer to any location, virtual location or otherwise proximate occurrence of a transaction. A "point-of-transaction device" may refer to any device used to perform a transaction, either from the customer's perspective, the merchant's perspective or both. In some embodiments, the point-of-transaction device refers only to a customer's device, in other embodiments it refers only to a merchant device, and in yet other embodiments, it refers to both a customer device and a merchant device interacting to perform a transaction. For example, in one embodiment, the point-of-transaction device refers to the customer's mobile device configured to communicate with a merchant's point of sale terminal, whereas in other embodiments, the point-of-transaction device refers to the merchant's point of sale terminal configured to communicate with a customer's mobile device, and in yet other embodiments, the point-of-transaction device refers to both the customer's mobile device and the merchant's point of sale terminal configured to communicate with each other to carry out a transaction.

In some embodiments, a point-of-transaction device is or includes an interactive computer terminal that is configured to initiate, perform, complete, and/or facilitate one or more transactions. A point-of-transaction device could be or include any device that a customer may use to perform a transaction with an entity, such as, but not limited to, an ATM, a loyalty device such as a rewards card, loyalty card or other loyalty device, a magnetic-based payment device (e.g., a credit card, debit card, or the like), a personal identification number (PIN) payment device, a contactless payment device (e.g., a key fob), a radio frequency identification device (RFID) and the like, a computer, (e.g., a personal computer, tablet computer, desktop computer, server, laptop, or the like), a mobile device (e.g., a smartphone, cellular phone, personal digital assistant (PDA) device, MP3 device, personal GPS device, or the like), a merchant terminal, a self-service machine (e.g., vending machine, self-checkout machine, or the like), a public and/or business kiosk (e.g., an Internet kiosk, ticketing kiosk, bill pay kiosk, or the like), a gaming device, and/or various combinations of the foregoing.

In some embodiments, a point-of-transaction device is operated in a public place (e.g., on a street corner, at the doorstep of a private residence, in an open market, at a public rest stop, or the like). In other embodiments, the point-of-transaction device is additionally or alternatively operated in a place of business (e.g., in a retail store, post office, banking center, grocery store, factory floor, or the like). In accordance with some embodiments, the point-of-transaction device is not owned by the customer of the point-of-transaction device. Rather, in some embodiments, the point-of-transaction device is owned by a mobile business operator or a point-of-transaction operator (e.g., merchant, vendor, salesperson, or the like). In yet other embodiments, the point-of-transaction device is owned by the financial institution offering the point-of-transaction device providing functionality in accordance with embodiments of the invention described herein.

Embodiments of the invention are directed to a system, method, or computer program product for a distributive network system with specialized data feeds associated with the distributive network and specific triggering events associated with the data feeds for spend analysis data transformation and anonymization. In this way, embodiments of the present invention identify and utilize total spend data or other data associated with a customer at a financial institution. The invention identifies the customer transactions and subsequently using machine learning system applications aggregate information in an anonymous way and provide the data to third-party organizations to create value for customers. In some embodiments, the invention compiles data associated with customers and storing the data in an index. The established index may be a common index that is searchable in order to identify members of a population sample desired to review or provide to third parties. Once a request is received for a population sample, the system may anonymizing the identities of sample members to each party. Anonymization is done via encryption of identification of individual customers in each sample utilizing the specialized data feeds and distributive network system environment. In some embodiments, once encrypted, the system may exchange statistics and characteristics of the sample population in a manner that precludes the receiver from learning anything specific about a particular member of the sample.

Given the desire for privacy in today's society, individuals are hesitant to allow their personal information to be shared with other people or businesses. Nevertheless, businesses, health care providers, and educational system, among other entities, are often interested in characteristics of individuals meeting certain criteria. For example, a business may be interested in the characteristics of individuals responding to an advertisement in order to better understand or target advertisements for the future. Similarly, health care providers may be interested in who is responding to medication or treatment and the characteristics of those individuals. Providing aggregated anonymous data that mirrors the reality of individual data but that is not a true representation of reality can improve targeted, predictive modeling while still retaining individual privacy. A system for providing anonymous data in response to a request for such information is therefore advantageous in a variety of fields including marketing, education, and health.

Figure 1:
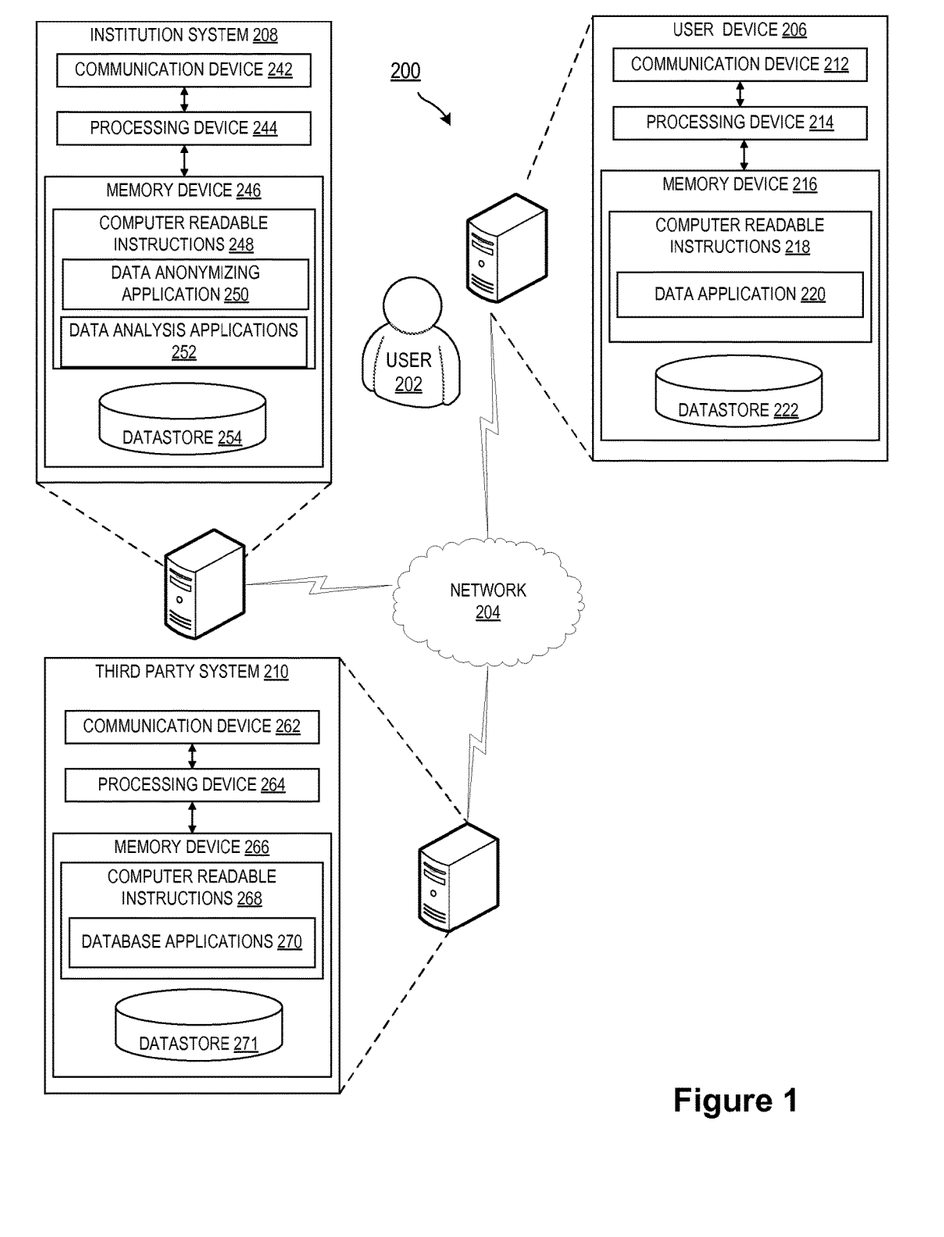
FIG. 1 illustrates an oblivious transfer anonymous user creation system environment, in accordance with an embodiment of the invention.

FIG. 1 illustrates an oblivious transfer anonymous user creation system environment 200, in accordance with one embodiment of the invention. The environment 200 includes a user device 206, an institution system 208, and in some embodiments a third party system or device 210. The user 202 is associated with the user device 206 and can include an owner of the device 144, parties that have authorized access to the device 206, an employee, associate, and the like. The user device 206 can include any type of device such as a computing device, a mobile device, or the like. The systems and devices communicate with one another over the network 204 and perform one or more of the various steps and/or methods according to embodiments of the disclosure discussed herein.

The network 204 may include a local area network (LAN), a wide area network (WAN), and/or a global area network (GAN). The network 204 may provide for wireline, wireless, or a combination of wireline and wireless communication between devices in the network. In one embodiment, the network 204 includes the Internet.

The user device 206, the institution system 208, and the third party system 210 each include a computer system, server, multiple computer systems and/or servers or the like. The institution system 208, in the embodiments shown has a communication device 242 communicably coupled with a processing device 244, which is also communicably coupled with a memory device 246. The processing device 244 is configured to control the communication device 242 such that the institution system 208 communicates across the network 204 with one or more other systems. The processing device 244 is also configured to access the memory device 246 in order to read the computer readable instructions 248, which in some embodiments includes data anonymizing applications 250 and data analysis applications 252. The data anonymizing application 250 may be configured to compile and store data associated with customers in an index, allow index to be presented in searchable format, anonymize the data requested from the index via encryption of identification of individual customers in each sample, and exchange statistics and characteristics of the sample population in a manner that precludes the receiver from learning anything specific about a particular member of the sample. The data analysis application 252 may analyze the data in the database to identify criteria for responding to the request for information. The memory device 246 also includes a datastore 254 or database for storing pieces of data that can be accessed by the processing device 244, such as data on individuals (e.g., financial transaction data, medical data, educational data).

As used herein, a "processing device," generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 214, 244, or 264 may further include functionality to operate one or more software programs based on computer-executable program code thereof, which may be stored in a memory. As the phrase is used herein, a processing device 214, 244, or 264 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "memory device" generally refers to a device or combination of devices that store one or more forms of computer-readable media and/or computer-executable program code/instructions. Computer-readable media is defined in greater detail below. For example, in one embodiment, the memory device 246 includes any computer memory that provides an actual or virtual space to temporarily or permanently store data and/or commands provided to the processing device 244 when it carries out its functions described herein.

The user device 206 includes a communication device 212 and communicably coupled with a processing device 214, which is also communicably coupled with a memory device 216. The processing device 214 is configured to control the communication device 212 such that the target device 144 communicates across the network 204 with one or more other systems. The processing device 214 is also configured to access the memory device 216 in order to read the computer readable instructions 218, which in some embodiments includes a data application 220 for running specific programs and developing requests for information. The memory device 216 also includes a datastore 222 or database for storing pieces of data that can be accessed by the processing device 214.

The third party system 210 includes a communication device 262 communicably coupled with a processing device 264, which is also communicably coupled with a memory device 266. The processing device 264 is configured to control the communication device 262 such that the third party system 210 communicates across the network 204 with one or more other systems. The processing device 264 is also configured to access the memory device 266 in order to read the computer readable instructions 268, which in some embodiments include database applications 270 for performing various tasks such as providing characteristic data on the plurality of individuals, and so forth. The memory device 266 also includes a datastore 271 or database for storing pieces of data that can be accessed by the processing device 264.

The specific applications 220, 250, 252, and 270 within the distributive network are specifically designed for instructing the processing devices 214, 244 and 264 to perform specific various steps of the methods discussed herein. In various embodiments, one or more of the applications 220, 250, 252, and 270 are included in the computer readable instructions stored in a memory device of one or more systems or devices other than the systems 208 and 210 and the user device 206. For example, in some embodiments, the application 220 is stored and configured for being accessed by a processing device of one or more third party systems 292 connected to the network 204. In some embodiments, the applications 220, 250, 252, and 270 may be considered to be working together as a singular application despite being stored and executed on different systems.

In various embodiments, one of the systems discussed above, such as the institution system 208, is more than one system and the various components of the system are not collocated, and in various embodiments, there are multiple components performing the functions indicated herein as a single device. For example, in one embodiment, multiple processing devices perform the functions of the processing device 244 of the institution system 208 described herein. In various embodiments, the institution system 208 includes one or more of the external systems 296 and/or any other system or component used in conjunction with or to perform any of the method steps discussed herein. In various embodiments, the institution system 208, the third party system 210, and the user device 206 and/or other systems may perform all or part of a one or more method steps discussed above and/or other method steps in association with the method steps discussed herein.

Figure 2:
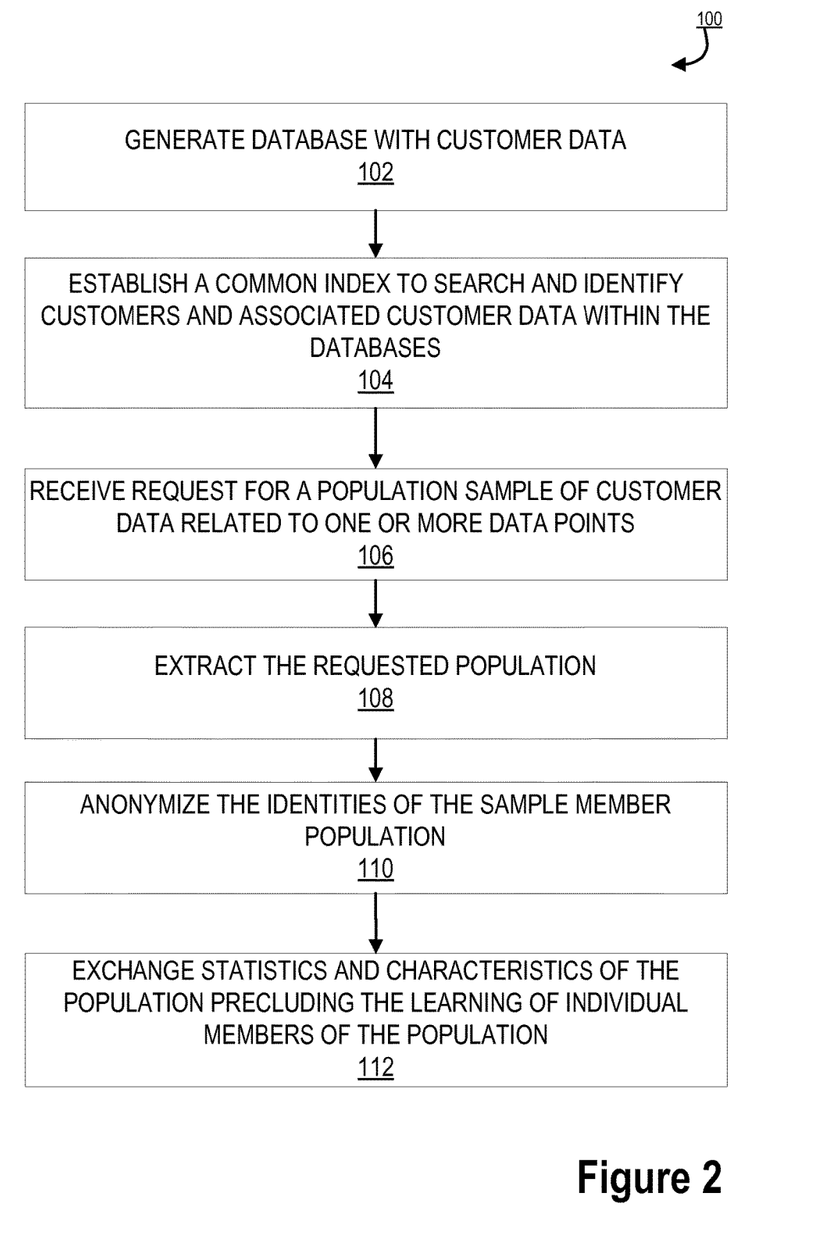
FIG. 2 illustrates a high level process flow of anonymous user creation, in accordance with an embodiment of the invention.

FIG. 2 provides a high level process flow illustrating anonymous user creation 100, in accordance with an embodiment of the invention. As illustrated in block 102, the process 100 is initiated by generating databases with customer data. This data may comprise transaction data of a customer, such as item level data for purchases, times of purchases, product category of purchases, merchant the customer transacted with, and/or the like. The data may include public and NPI data forms. The data may be compiled such that it is searchable based on one or more data points.

As illustrated in block 104, the system may establish a common index to search and identify customers and associated data within the database. The common index is searchable based on the data in the database. In this way, the common index that is searchable in order to identify data from one or more customers that are similar to a desired searchable data point, such as by merchant, time, location, product purchase, brand purchases, or the like.

As illustrated in block 106, the process 100 continues by receiving a request for a population sample of customer data related to one or more data points. The request may be from one or more merchants, advertisers, private individuals, nonprofit organizations, governmental agencies, financial institution, or the like. For example, a business customer of the financial institution may desire to know which individual customers of the financial institution made a purchase in response to an advertisement campaign.

The data points requested may include one or more information about transaction habits, transaction times, transaction locations, brands of transactions or the like for one or more customers within a geographic, demographic, age, or the like category. For example, a requestor may be interested in the efficacy of an advertisement and request information from a financial institution regarding the financial institution customers that made a purchase when the advertisement was running. The data request may be for customer total spend data, such as data associated with transaction histories, spend analysis, spending trends, brand loyalty trends, merchant loyalty trends, product loyalty, and/or the like.

In an embodiment, a population of interest is a group of individuals that share one or more characteristics. In some embodiments, the population of interest is defined by an action taken by the individuals in the population. For example, each individual in the population may have made a purchase at a specific time, purchases at specific merchants, purchases with specific payment means, purchases at specific locations, or the like. In some embodiments, the action is relevant to the requester searching for information. For example, a merchant may desire to know the characteristics of individuals that made a purchase at a store during a specific period of time in order to gauge the success of a marketing campaign. In some embodiments, the population of interest is a group of individuals that are also customers of a financial institution.

In an embodiment, the system receives the request electronically. For example, the requestor may submit the request via an online interface. The online interface may allow the requestor to specify various demographic and/or financial information-related characteristics of the population of interest. For example, the system may provide a list of types of data that the system can use to distinguish populations. Purchases, deposits, and transfers may all include information that can be used to define a population. In one example, deposits from employers or payor names on checks may be used to generate a population of individuals that work at or receive funds from a specific entity.

In some embodiments, the request comprises criteria for individuals in the population of interest. The criteria may be used to define the population. The criteria may be obligatory or aspirational when defining the population. In other words, in some embodiments, an individual must meet the criteria in order to be considered part of the population. In another embodiment, an individual should meet or come close to meeting the criteria to be considered part of the population. The criteria may be numerical (e.g., a minimum account balance or transaction amount), binary (e.g., the user is a home owner or the user is not a home owner), categorical (e.g., city of residence), ordinal (e.g., stages of cancer), geographic (e.g., location, proximity), temporal (e.g., time, elapsed time, date), or the like.

Once a request is made, the system may extract the requested population from the database via the common index, as illustrated in block 108. Providing information in response to the request for information would traditionally provide data that could be reverse-engineered and allow the identity of one or more individuals in the population to be determined. For example, an iterative approach could be used to identify a single individual in the population and associate that individual with personal information (e.g., financial account data, medical records, educational records, political records). In contrast, the disclosure herein discloses a system and method that provides information in response to the request for information, wherein the information is anonymous but still responds to the request for information.

In some embodiments the system determines criteria associated with the population of interest from the request. In a first embodiment, the system determines the criteria by receiving them from the requestor. In a second embodiment, the system determines the criteria by evaluating the request and generating criteria that when met would fulfill the request. For example, a merchant may request information on all individuals that purchased during a sale period. The system determines the criteria as being anyway that had a purchase transaction at the merchant during a specific time period. In some embodiments, the criteria are determined based on a combination of being received from the user and being determined in order to meet the request.

In some embodiments, the system identifies an individual representative of the population of interest in order to determine the criteria. In some embodiments, the individual meets all of the criteria requested by the user when submitting the request for information. For example, a requestor may have requested information on how many people purchased an item on a specific date between a certain time and for a certain amount (e.g., a range for the transaction amount). The individual representative of the population of interest will be selected by the system based on the individual meeting all of these criteria.

In an embodiment, no individual in the database meets 100% of the criteria requested by the requestor. In this situation, the system selects an individual that most closely meets the criteria. For example, the system may select an individual that meets the location and time requirement but is outside the range for transaction amount. The system will, in this example, select an individual that is closest to the transaction amount range.

In some embodiments, the system accesses public information regarding customers to identify the individual or supplement information from the database. For example, the system may access social media sites to determine whether an individual is a fan of or likes a specific merchant.

Furthermore, the system may index the customer data based on characteristics of the individuals within one or more categories in the database. As used herein, a characteristic is facet associated with the behavior, account history, or demographics of the individual. For example, the characteristic may be the frequency with which the individual makes a purchase at a merchant, the average time between purchases, the percentage of time the individual votes early in elections, or the number of times a week the individual exercises. The categories determined by the system will vary based on the request for information and, in some embodiments, be directly relevant to the request for information.

For example, the number of times a week that the individual exercises may not be relevant to a request for information regarding individuals that made a purchase during a sale. Examples of account history characteristics include balances, purchase or return history, contributions to accounts (e.g., retirement savings, auto-deposit of paychecks), specific types of transactions (e.g., student loans, mortgage payment), and the like. Examples of demographic characteristics include location, age, income, home ownership status, family status (e.g., married, divorced, children), educational level, employment status, and the like.

In some embodiments, once the data is extracted, the system may anonymize the identities of the members of the population extracted, as illustrated in block 110. In some embodiments, the system may anonymize the identities of the all of the customers associated with the customer data in the database prior to receiving the request for data. In other embodiments, the system may anonymize the identities of only the sample population of customer data points requested.

Finally, as illustrated in block 112, the process 100 is completed by exchanging statistics and characteristics of the population that precludes the learning of the individual members of the population.

Figure 3:
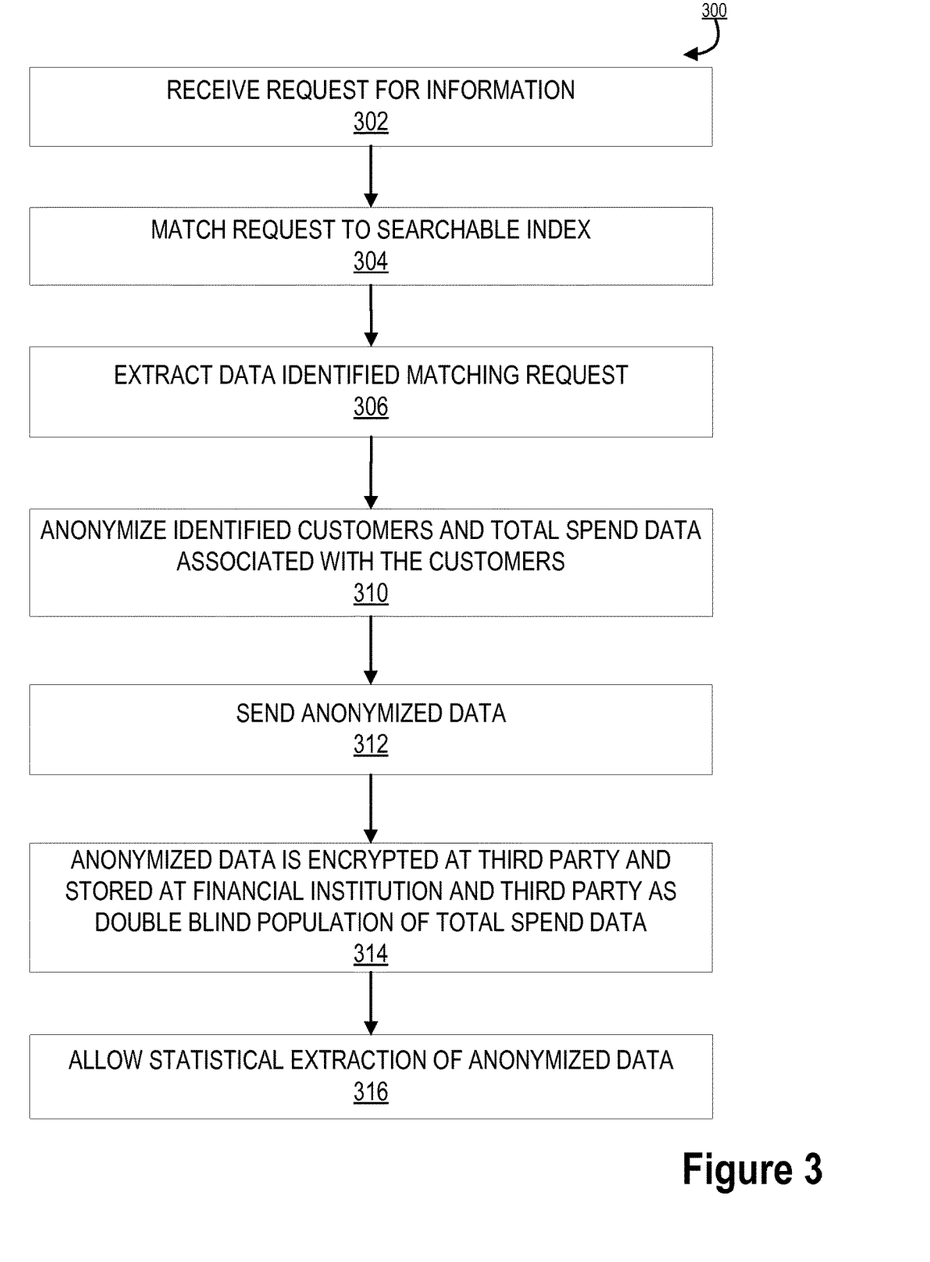
FIG. 3 illustrates a process flow for anonymizing user data, in accordance with an embodiment of the invention.

FIG. 3 illustrates a process flow for anonymizing user data 300, in accordance with an embodiment of the invention. As such, once a database is generated, the system may receive, through a distributive network, one or more requests for data or information on the database, as illustrated in block 302. The request may be from one or more merchants, advertisers, private individuals, nonprofit organizations, governmental agencies, financial institution, or the like. The data request may be for customer total spend data, such as data associated with transaction histories, spend analysis, spending trends, brand loyalty trends, merchant loyalty trends, product loyalty, and/or the like.

Next, the system may match the request to the data on the database via the searchable index, as illustrated in block 304. Once data is matched from the database to the request, the data is extracted that matches the request, as illustrated in block 306.

Next, the system may anonymize the identified customers and his/her total spend data associated with the match, as illustrated in block 310. Anonymization, which is described in further detailed below, includes an encryption using a strong encryption function and one or more cyrptosystems that are at least partially or fully homomorphic. Homomorphic encryption allows multiplication and/or addition on ciphertexts that, once decrypted, match the result that would have occurred had the operations been carried out on the plaintext. This anonmizing includes a strong encryption method with a key and a homomorphic encryption of the real values. As such, providing offset data, but still an accurate valuation of the data.

Once anonymized, the total spend data for the customers may be sent as anonymized data to the requestor, as illustrated in block 312. In some embodiments, the anonymized data is further encrypted at the requestor and stored in the double encrypted form at both the requestor and the financial institution as a double blind population of data, as illustrated in block 314. Finally, the system may allow for statistical extraction of the anonymized data for use in customer valuation and advertisement reviews, as illustrated in block 316. The statistical extraction may include a double encrypted customer value data by allowing requestor to include additional requestor data with the aggregated encrypted matched data and encrypt using random number encryption.

As discussed above, in some embodiments the invention establishes a common index to identify members of a population sample, anonymizes the identities of sample members to each party, and exchanges statistics and characteristics of the sample population in a manner that precludes the receiver from learning anything specific about a particular member of the sample. For example, two parties, $P_1$ and $P_2$ are present. $P_1$ represents the requestor of information from the database. The database $P_1$ has a population of customers $p_1$ for whom it maintains non-public data. $P_2$ is the receiver of the request for information, and has its own population of customers $p_2$ for whom it maintains non-public data as well. To be useful, it is presumed that there is some overlap or intersection between the members of $p_1$ and $p_2$. Also, it is understood that $P_2$ has some data on its population $p_2$ that is useful to $P_1$, and that there is some mutually-beneficial purpose for the exchange of information in a manner that is not in violation of legislative statute or customer agreement.

Figure 4A:
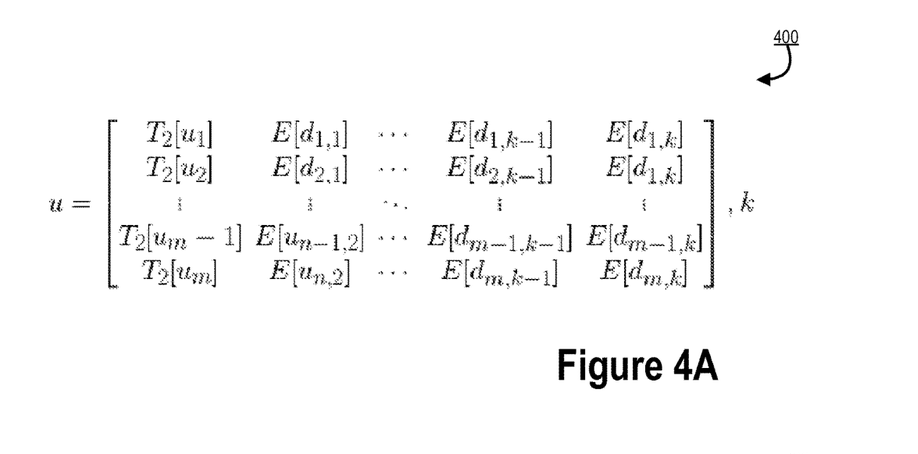
FIG. 4A illustrates a oblivious transfer anonymous user creation matrix, in accordance with an embodiment of the invention.

In the initial exchange of data between $P_1$ and $P_2$, the intersection of the two sample populations of interest must be identified. To do this, $P_1$ provides public identifying elements of a sample $s_1$ of population $p_1$ along with a set of variables, either categorical or discrete, that describe the members of $s_1$. $P_2$ then uses this information to create a purposive sample $s_2$ from its population $p_2$ that identifies the overlap between the two populations, $s_2 \varepsilon s_1 \cap P_2$. In order to preserve the anonymity its customers, $P_2$ then takes each member of $s_2$, encrypts the identifying value for each member and encrypts it using a strong encryption function $T_2$, encrypts the mutually-agreed population variables using a cryptosystem E that is at least partially-homomorphic with respect to addition and stores the result in an m×n matrix, u. The matrix 400, as illustrated in FIG. 4A presents a oblivious transfer anonymous user creation matrix 400, in accordance with an embodiment of the invention, where m is the number of customers in $s_2$ and n=k+1 is the number of data elements (k) for each customer. $P_2$ then randomizes the order of the resulting set, and returns the values to $P_1$ for use as an index in future queries by $P_1$ on $s_2$. $P_2$ may also store the collection of tuples mapping $e_2$:$s_1 \rightarrow s_2$ for optimization of future queries from $P_1$. $P_1$ receives the matrix 400 as well as the public key k from $P_2$.

At this point, $P_1$ is unable to determine the identity of the members of $s_2$ in matrix 400, nor is it able to interpret the values of the associated data elements for each customer. Therefore, secrecy of private data with respect to each customer has been maintained in the transfer of information from $P_2$ to $P_1$. However, if $P_1$ now requests further statistics on $s_2$ via u from $P_2$, $P_2$ is able to learn the specific members of each sample $s_n$ in which $P_1$ is interested, either through direct decryption of T[u] or through use of E[d] as a hash lookup. With the public key k, $P_1$ is able to perform additive operations on the data encrypted in E. In order to preserve bidirectional secrecy of data, $P_1$ now double-encrypts the T[u] values using its own strong encryption function $T_1$, and uses the public key k to add a large random number $R_u$ to each E[d] value. $P_1$ stores the $(T_1[T_2[u]], R_u)$ tuples for use in later transactions with $P_2$. $P_1$ now shuffles the order of rows and sends the modified matrix, u, to $P_2$.

Figure 4B:
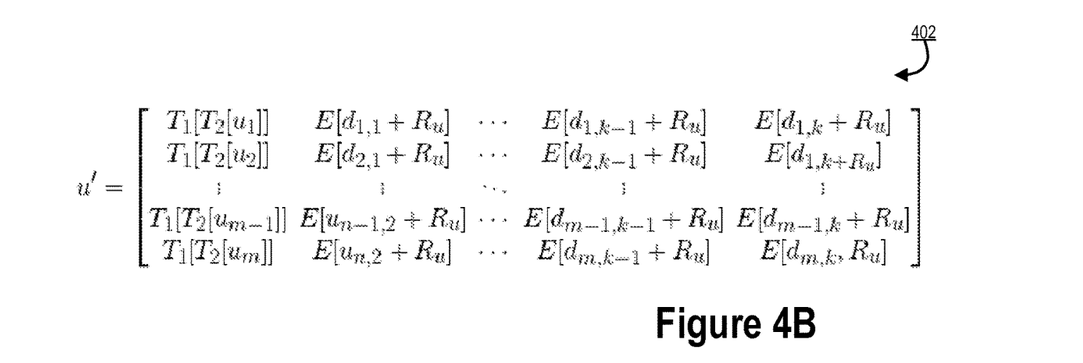
FIG. 4B illustrates a oblivious transfer anonymous user creation matrix, in accordance with an embodiment of the invention.

Subsequently, as illustrated in FIG. 4B, an oblivious transfer anonymous user creation matrix 402 is presented, in accordance with an embodiment of the invention. The matrix 402, as illustrated is received by $P_2$ from $P_1$ in the form of matrix, $u^1$, as illustrated in FIG. 4B.

At this point, $P_1$ is only able to determine membership in a particular sample of $p_1$, but not the identity of any specific member. Likewise, $P_2$ is unable to determine neither the identity of specific members nor the specific sample to which the member belongs. However, $P_2$ is able to calculate requested values on any collection of $E[d+R]$ values provided by $P_1$ by using a decryption function D and a private key d.

Figure 4C:
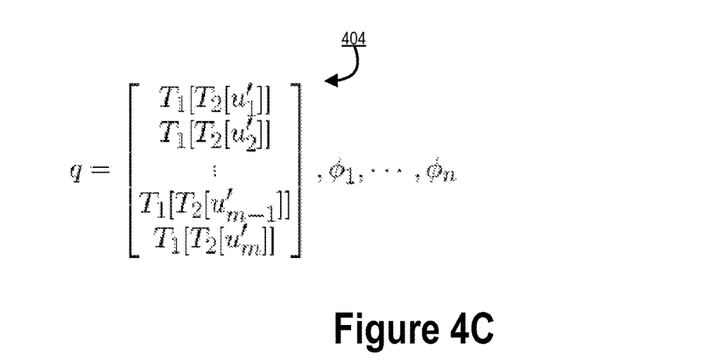
FIG. 4C illustrates a request matrix, in accordance with an embodiment of the invention.

FIG. 4C illustrates a request matrix 404, in accordance with an embodiment of the invention. In this way, if $P_1$ sends a query q to $P_2$ of the form of the request matrix 404, requesting a set of values $\Phi$ to be calculated on q using additive methods on E $[u+R_u]$, $P_2$ uses $T_1[T_2[u]]$ as an index to retrieve the elements of interest from u, decrypts the corresponding $E[d+R_u]$ values, computes the desired $\Phi$ values, and returns them to $P_1$ as a result r: r={q, $\Phi$, $\Sigma(u+R_u)$}. $P_1$ may then looks up the corresponding $R_u$ value for u from which q is derived, and subtracts $\Sigma(R_u)$ from $\Sigma(u+R_u)$ to recover the actual values of $\Phi$ for $s_1$.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, or the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a verity of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, or the like) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for providing anonymous user creation in response to a request for information, the system comprising:
- a memory device with computer-readable program code stored thereon;
- a communication device;
- a processing device operatively coupled to the memory device and the communication device, wherein the processing device is configured to execute the computer-readable program code to:
  - generate a database with a searchable common index of customer data associated with customers, wherein the customer data comprises customer identifications and includes customer transaction data;
  - receive a request from a requestor for a population of data points within the database;
  - match the request for the population of data points to customer data associated with customer total spend on the database, wherein the match generates a sample population of customer data that represents a customer value for the requestor;
  - encrypt the matched data using a cryptosystem comprising homomorphic encryption, wherein the homomorphic encryption is a fully homomorphic encryption that allows multiplication and/or addition on ciphertexts that, once decrypted, match a result had operations been carried out on the plaintext;
  - send, via a distributive network, an aggregated encrypted matched data for the population of data points that includes an encrypted customer identification to the requestor;
  - compile a set of double encrypted customer value data for the population of data points by allowing the requestor to include additional requestor data with the aggregated encrypted matched data and allow double encryption by the requester using provided random number encryption; and
  - store compiled set of double encrypted customer value data for the population of data points at a financial institution and the requestor.

2. The system of claim 1, wherein a request includes customer information of the requestor, such as a customer identification, wherein the requestor provides the system with information about one or more customers of the requestor to receive total spend data for the one or more customers.

3. The system of claim 1, wherein the homomorphic encryption includes partially homomorphic encryption.

4. The system of claim 1, wherein the requestor is a merchant and requestor data includes identifications of one or more customer transactions at the merchant.

5. The system of claim 1, wherein the searchable common index of customer data associated with a customer is further compiled to create a customer total spend, wherein the customer total spend is a holistic view of customer spending over a time frame.

6. The system of claim 1, wherein receiving the request from the requestor for the population of data points further comprises a request for customer data that matches one or more customer transactions at the requestor.

7. The system of claim 1 further comprising exchanging the double encrypted customer value data for statistics and characteristic analysis of the sample population.

8. A computer program product for providing anonymous user creation in response to a request for information, the computer program product comprising at least one non-transitory computer-readable medium having computer-readable program code portions embodied therein, the computer-readable program code portions comprising:
- an executable portion configured for generating a database with a searchable common index of customer data associated with customers, wherein the customer data comprises customer identifications and includes customer transaction data;
- an executable portion configured for receiving a request from a requestor for a population of data points within the database;
- an executable portion configured for matching the request for the population of data points to customer data associated with customer total spend on the database, wherein the match generates a sample population of customer data that represents a customer value for the requestor;
- an executable portion configured for encrypting the matched data using a cryptosystem comprising homomorphic encryption, wherein the homomorphic encryption is a fully homomorphic encryption that allows multiplication and/or addition on ciphertexts that, once decrypted, match a result had operations been carried out on the plaintext;
- an executable portion configured for sending, via a distributive network, an aggregated encrypted matched data for the population of data points that includes an encrypted customer identification to the requestor;
- an executable portion configured for compiling a set of double encrypted customer value data for the population of data points by allowing the requestor to include additional requestor data with the aggregated encrypted matched data and allow double encryption by the requester using provided random number encryption; and
- an executable portion configured for storing compiled set of double encrypted customer value data for the population of data points at a financial institution and the requestor.

9. The computer program product of claim 8, wherein a request includes customer information of the requestor, such as a customer identification, wherein the requestor provides the system with information about one or more customers of the requestor to receive total spend data for the one or more customers.

10. The computer program product of claim 8, wherein the homomorphic encryption includes partially homomorphic encryption.

11. The computer program product of claim 8, wherein the requestor is a merchant and requestor data includes identifications of one or more customer transactions at the merchant.

12. The computer program product of claim 8, wherein the searchable common index of customer data associated with a customer is further compiled to create a customer total spend, wherein the customer total spend is a holistic view of customer spending over a time frame.

13. The computer program product of claim 8, wherein receiving the request from the requestor for the population of data points further comprises a request for customer data that matches one or more customer transactions at the requestor.

14. The computer program product of claim 8 further comprising an executable portion configured for exchanging the double encrypted customer value data for statistics and characteristic analysis of the sample population.

15. A computer-implemented method for providing anonymous user creation in response to a request for information, the method comprising:
- providing a computing system comprising a computer processing device and a non-transitory computer readable medium, where the computer readable medium comprises configured computer program instruction code, such that when said instruction code is operated by said computer processing device, said computer processing device performs the following operations:
- generating a database with a searchable common index of customer data associated with customers, wherein the customer data comprises customer identifications and includes customer transaction data;
- receiving a request from a requestor for a population of data points within the database;
- matching the request for the population of data points to customer data associated with customer total spend on the database, wherein the match generates a sample population of customer data that represents a customer value for the requestor;
- encrypting the matched data using a cryptosystem comprising homomorphic encryption, wherein the homomorphic encryption is a fully homomorphic encryption that allows multiplication and/or addition on ciphertexts that, once decrypted, match a result had operations been carried out on the plaintext;
- sending, via a distributive network, an aggregated encrypted matched data for the population of data points that includes an encrypted customer identification to the requestor;
- compiling a set of double encrypted customer value data for the population of data points by allowing the requestor to include additional requestor data with the aggregated encrypted matched data and allow double encryption by the requester using provided random number encryption; and
- storing compiled set of double encrypted customer value data for the population of data points at a financial institution and the requestor.

16. The computer-implemented method of claim 15, wherein a request includes customer information of the requestor, such as a customer identification, wherein the requestor provides the system with information about one or more customers of the requestor to receive total spend data for the one or more customers.

17. The computer-implemented method of claim 15, wherein the searchable common index of customer data associated with a customer is further compiled to create a customer total spend, wherein the customer total spend is a holistic view of customer spending over a time frame.

18. The computer-implemented method of claim 15, wherein receiving the request from the requestor for the population of data points further comprises a request for customer data that matches one or more customer transactions at the requestor.

19. The computer-implemented method of claim 15 further comprising exchanging the double encrypted customer value data for statistics and characteristic analysis of the sample population.

* * * * *